Figure 1:
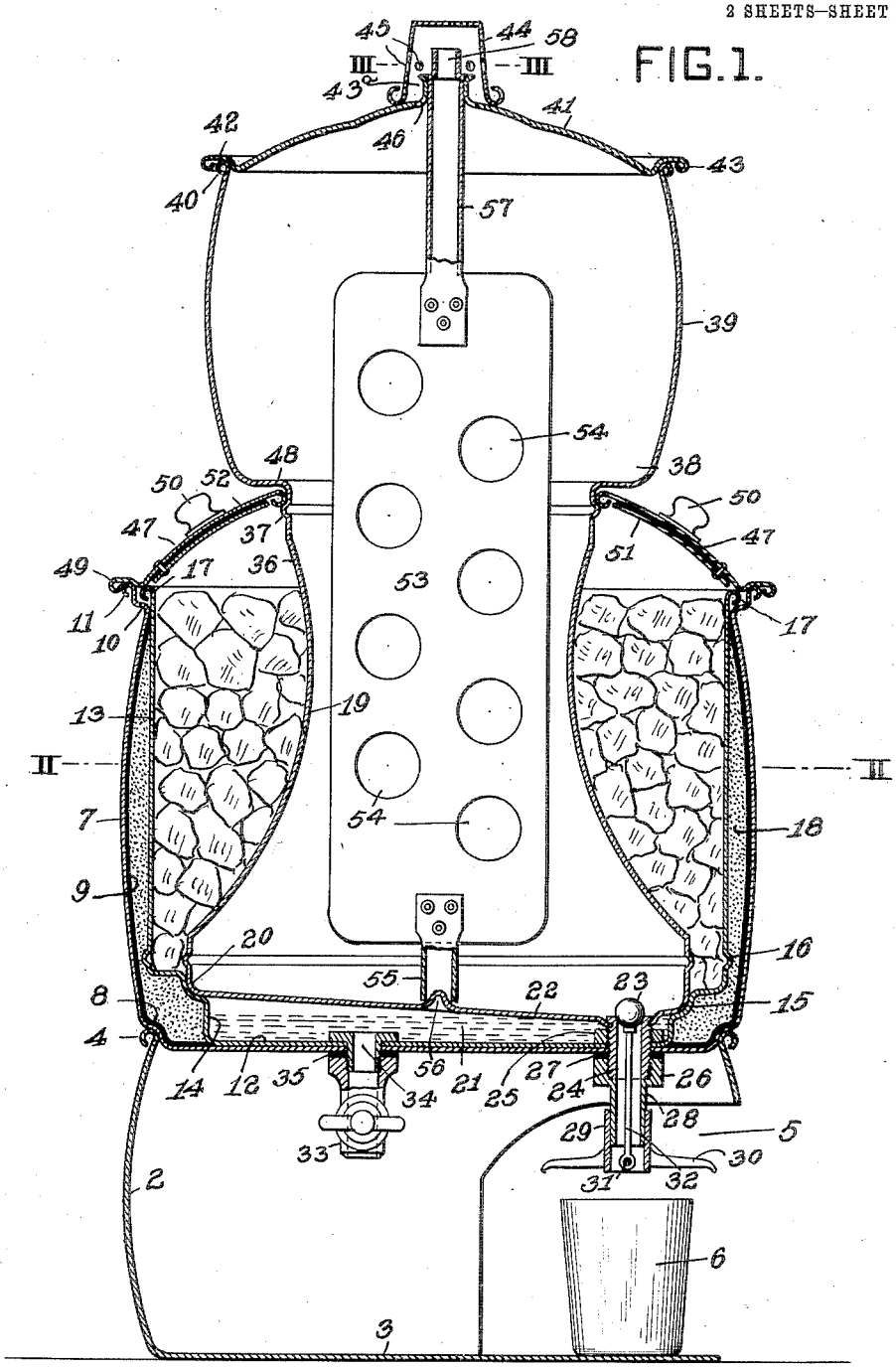

G. VINEY.
BUTTERMILK COOLER.
APPLICATION FILED DEC. 17, 1912.

1,081,350.

Patented Dec. 16, 1913.

2 SHEETS—SHEET 1.

WITNESSES

INVENTOR

G. VINEY.
BUTTERMILK COOLER.
APPLICATION FILED DEC. 17, 1912.
1,081,350.
Patented Dec. 16, 1913.
2 SHEETS—SHEET 2.
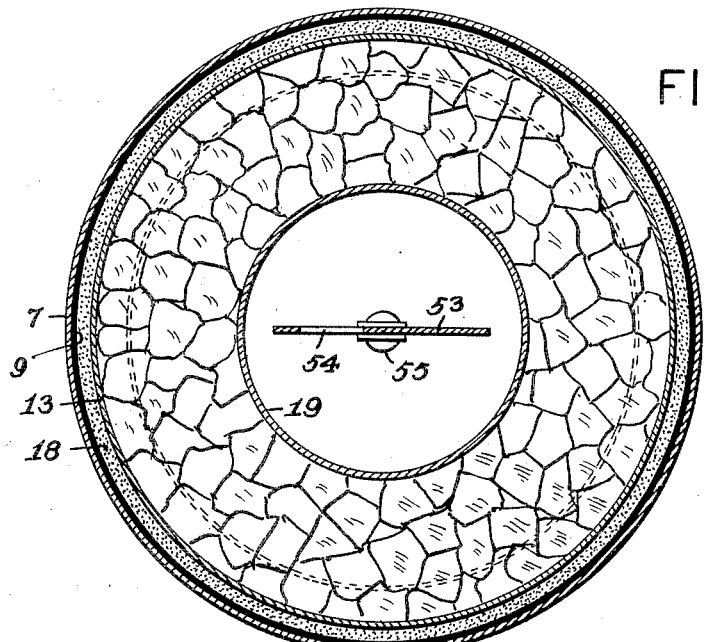
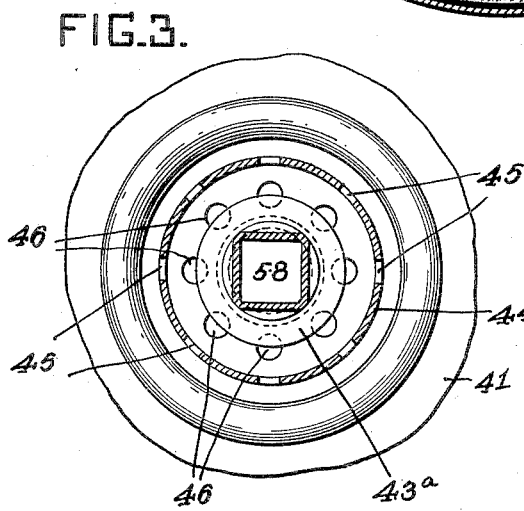
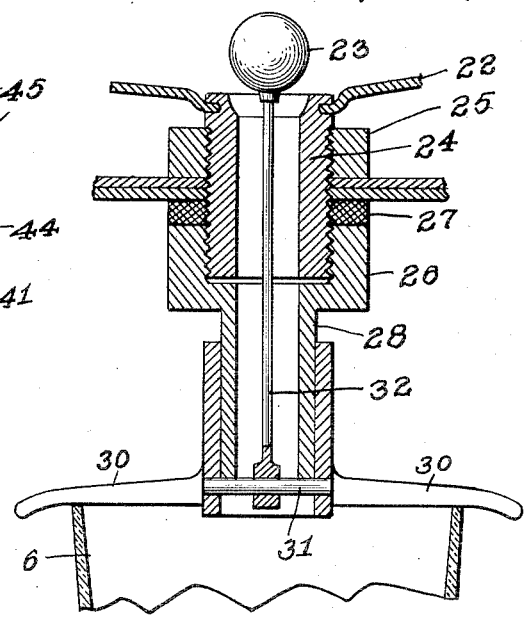
WITNESSES
INVENTOR

UNITED STATES PATENT OFFICE.

GEORGE VINEY, OF PITTSBURGH, PENNSYLVANIA.

BUTTERMILK-COOLER.

1,081,350.  Specification of Letters Patent. Patented Dec. 16, 1913.

Application filed December 17, 1912. Serial No. 737,286.

*To all whom it may concern:*

Be it known that I, GEORGE VINEY, a citizen of the United States, residing at Pittsburgh, in the county of Allegheny and State of Pennsylvania, have invented certain new and useful Improvements in Buttermilk-Coolers, of which the following is a specification.

My invention has for its object to provide a refrigerating container for buttermilk or other fluids.

The container comprises an inner elongated vessel of special formation adapted to receive the buttermilk, etc., and having a centrally arranged agitator or stirrer for stirring the contents from time to time, together with a cover having circulation apertures for gases, etc. A surrounding vessel adapted to receive the milk container having an ice holding space, a two-part removable cover and a draining faucet. An outer surrounding case provided with a supporting pedestal or base, adapted to receive the latter vessel, with intervening insulation; these parts being designed and assembled in the manner illustrated in the drawings, and provided with a withdrawal faucet or discharge arranged for automatic operation, together with other features of improvement and advantage as shall be more fully hereinafter described.

In the drawings—Figure 1 is a vertical sectional view of the apparatus in its normal condition. Fig. 2 is a cross section on the line II. II. of Fig. 1. Fig. 3 is an enlarged cross section on the line III. III. of Fig. 1. Fig. 4 is an enlarged detail sectional view of the discharge valve for the milk showing it raised by the drinking cup.

The entire apparatus is designed to be set upon any suitable support, as a table, bar, etc., and is provided with a supporting barrel shaped base 2 which may have a continuous bottom portion 3, as shown, or which may be merely hollow at the bottom with finished edges, as desired. The upper portion of the base is preferably reinforced by rounding the upper edge around an annular wire, as indicated at 4. The base as thus constructed, preferably of sheet metal, presents a round smooth appearance, constituting the primary unit of the assembled cooler, and is cut out at one side, as indicated at 5, for clearance of the drinking cup 6, operable with the discharge valve or faucet in the manner hereinafter described. Set upon the base 2 is the secondary unit of the apparatus, consisting of the barrel-shaped vessel 7, also preferably of sheet metal, and which constitutes the insulating inclosing frame for the refrigerating vessel.

The outer vessel 7 is circular in form, making interfitting engagement with the rounded edge 4 of the base 2, by the annular recess and downwardly projecting shoulder formed around the outer bottom portion of the insulating vessel, as indicated at 8. The entire inner body portion of the insulating vessel, except the central bottom part, is covered with an insulating lining 9 of sheet asbestos or other suitable material.

At its upper edge, the insulating vessel 7 is provided with a shouldered portion 10 adapted to receive the upper edge portion of the ice container, the upper outer edge of the insulating vessel being also preferably rounded and reinforced, as indicated at 11, for the purpose of providing a finished edge, and also to receive the edge portions of the two-part removable cover.

Set within the insulating vessel 7, and resting upon its base by its own bottom 12, is the ice containing and milk-vessel-supporting vessel 13, also preferably made of sheet metal, having a contracted base portion 14 terminating in an annular rounded channel 15 for receiving the base of the milk container, then extended outwardly for almost the full diameter of the insulating vessel 7, preferably having one or more annular reinforcing beads 16 and then extending upwardly in cylindrical form, terminating in a rounded reinforced annular edge 17, nesting in the annular cavity above shoulder 10. Between the insulating vessel 7 and the ice container 13, is inserted a filling of any suitable insulating material, as ground cork, sawdust, etc., adapted to operate as heat insulation. In assembling these parts, the insulating vessel 7 is originally made of a maximum diameter at its middle portion, with the upper wall portion extending truly cylindrical thereabove, and after the insulation 18 is packed into place, the upper portion of the insulating vessel is drawn or pressed inwardly as clearly shown in the drawings, bringing the upper neck portion into close proximity to the upper portion of the ice container 13.

The milk container 19, also preferably made of sheet metal, is provided with a generally mushroom shaped base portion 20 of maximum diameter, rounded at its outer bottom edge to neatly fit into the receiving channel 15 of the base of the ice container, but sufficiently loose as to fit to permit of the circulation downwardly to the water space 21, of the water from the melted ice. The bottom 22 of the milk container slopes toward the outlet connection toward one side of the apparatus within the walls of the container, where I provide the discharge valve 23. Said valve, which may be in the form of a ball, as shown, or of other suitable form, seats upon a hollow bushing 24 having a crimped engagement with the bottom, as shown, and fixedly connected by a nut 25 and the outer tubular extension 26, with the bottom of the ice container and the insulating vessel respectively, an intervening packing 27 of rubber or other suitable material being preferably employed. By this construction the bottom portions of these vessels are fixedly held together. The tubular extension 26 extends downwardly by a reduced hollow portion 28, forming an extension of the valve bushing 24 and providing an outlet for the contents.

Telescopically mounted around the stem extension 28 is a vertically movable sleeve 29 having a plurality of projecting arms 30 for engagement by the upper edge of the cup 6, when lifted, the sleeve 29 having a limited range of movement, and being connected by a cross pin 31 with valve stem 32 of valve 23, so as to unseat the valve by raising the cup, the valve seating by gravity when it is lowered. This portion of the apparatus forms the subject matter of a separate application, filed herewith.

For the purpose of withdrawing the melted water from cavity 21 from time to time, I provide a cock or faucet 33 connected by screw joint with an outlet nipple 34, each of said parts being shouldered and with intervening packing 35 also assisting in tightly connecting the bottoms of the ice container and insulating vessel respectively. By this construction the water at the base of the apparatus is also capable of being used for drinking purposes.

The milk container 19 is very considerably narrower at its upper middle portion, within the ice container, as shown, for the purpose of reducing the diametrical cross section of the vessel, effecting a corresponding enlargement of the surrounding ice containing space and with a resulting increase of the refrigerating effect. Above its middle portion, the milk container is flared outwardly somewhat, as indicated at 36, and provided with an annular projecting shoulder 37 adapted to receive and support the inner annular edges of the two-part cover. Slightly above the annular shoulder 37, with sufficient intervening space for the cover, the milk container is diametrically enlarged, as indicated at 38, and then extended upwardly in barrel formation with outwardly bulging sides, like those of the base 2 and insulating vessel 7, providing the third unit 39, constituting the upper portion of the entire apparatus. This part of the milk container, which is entirely above the refrigerating vessel, serves as a reservoir to contain the fluid which passes downwardly into the refrigerating compartment, as it is drawn off from the base from time to time. The upper portion of the milk container reservoir unit 39 is also rounded by reinforcing annular edge 40, adapted to receive and support the upwardly rounding cover 41, which is pressed around its outer edge to provide a seating or nesting channel 42 within an outer reinforcing bead 43. At its central portion the cover is turned upwardly for a short distance, providing a cylindrical neck 43$^a$ adapted to receive and provide a bearing for the stem of the agitator. A finishing covering cup or cap 44 is set over the central top portion of the cover 41, as shown, said cup having a series of circulation apertures 45. The central neck portion of the cover is also provided with similar apertures 46, by which any gases, odors, etc., may escape from the interior.

The ice container and also the insulating vessel are covered over by two-part cover sections 47, 47, each made preferably in semi-circular form, having inner and outer reinforced supporting edges 48, 49, adapted to rest upon the annular shoulder 37 and edge 11 respectively, and each having a lifting button or stud 50, 50. These covers are also preferably made of sheet metal rounded in symmetrical form to provide a covering coping, and are preferably provided with an inner supplemental similarly shaped shell 51 riveted or otherwise secured to the outer shell, and with an inner refrigerating packing 52, of sheet asbestos or other suitable material.

The agitator or stirrer 53, which may be of any suitable construction, is as shown, of paddle form, made of sheet metal or wood having a plurality of transverse passages or openings 54 for circulation of the fluid. At its bottom, the stirrer is provided with the turning stem 57, which may be conveniently made of a tube flattened at the lower end and riveted, its upper end being squared, as indicated at 58, for attachment of a turning handle upon removal of cup 44.

The operation of the device as thus constructed is as follows: Ice having been placed in the ice container 13, filling the cavity between it and the milk container 19, as indicated, the milk container is filled or partially filled with milk, which may, when sufficiently cooled, be drawn from the bottom from time to time in the manner described. Due to the sloping bottom 22, all of the contents may be entirely emptied from the vessel at any time, rendering it unnecessary to leave any stale milk within the container, thus obviating the possibility of fermentation, etc. The presence of the agitator 53 enables the stirring of the contents from time to time, so that the bottom and top portions of the milk may be thoroughly commingled, releasing any gases of fermentation, and keeping the milk fresh and sweet, assisted by the circulating apertures at the top of unit 39. By this means milk, especially buttermilk, may be kept free from odor or other objectionable qualities ordinarily resulting from the keeping of a quantity of buttermilk in an ordinary receptacle in which the milk may stand for any length of time. Due to the shape of the milk container within the surrounding body of ice, the refrigerating action is utilized to the highest degree, the contracted neck portion and flaring surfaces of the mushroom-shaped base presenting ample exposure of the contents against the gravitating action of the reduced temperature.

The device is extremely clean and sanitary and capable at all times of being thoroughly cleansed, while preventing the possibility of the accumulation of any stale milk or foreign matter. The several parts, being made of sheet metal, stamped or pressed to shape, thereby avoid the necessity of riveted or soldered joints; the entire outer portions of the parts, or the inner portions, if desired, are or may be covered with enamel or other suitable covering, thereby greatly enhancing the appearance of the device, while its structure generally lends to it a shapely and artistic appearance. It is also extremely economical of ice, due to the insulation of the surrounding vessel, while all of the refrigerating qualities, as well as the melted water of the ice, are utilized.

The advantages of the invention will be appreciated by all those vending or using buttermilk and other liquids; it may be made of any desired capacity; the exterior of the various units may be embellished by any desired ornamentation, lettering, etc., while the material from which the cooler is made greatly reduces its weight while preventing the danger of breakage and resulting leaks.

What I claim is:

1. In a buttermilk cooler, the combination with an outer ice containing vessel, of an inner milk container having an upper reservoir portion, a middle contracted portion, and a flaring enlarged bottom sloping toward an opening within the walls of the container, an outlet connection extending from said opening downwardly through the outer ice containing vessel, and a valve controlling the flow through said outlet operable from below the valve, substantially as set forth.

2. In a buttermilk cooler, the combination with an ice containing vessel, of an outermost surrounding vessel, intervening insulating packing, an inner milk container having an upper reservoir portion, a middle contracted portion, and a flaring enlarged bottom sloping toward an outlet within the cross area of the container, and an outlet conduit communicating therewith extending through the bottoms of all of said vessels and provided with a valve having a depending stem, substantially as set forth.

3. In a buttermilk cooler, the combination of an outer casing of sheet metal, an inner ice containing vessel of sheet metal, intervening insulating packing material between said vessels, an innermost milk container within the ice containing vessel with an intervening ice cavity, said milk container having an upper reservoir portion, a middle contracted portion, and a flaring enlarged bottom sloping to an outlet opening within the cross area of the container, and a valve-controlled outlet extending downwardly from said opening through and fixedly connecting all of said vessels and having a valve provided with a depending operative device, substantially as set forth.

4. In a buttermilk cooler, the combination of an outer casing of sheet metal, an inner ice containing vessel of sheet metal, intervening insulating packing material between said vessels, an innermost milk container within the ice containing vessel with an intervening ice cavity, said milk container having an upper reservoir portion, a middle contracted portion, and a flaring enlarged bottom sloping to an outlet opening within the cross area of the container, a valve-controlled outlet extending downwardly from said opening through and fixedly connecting all of said vessels and having a valve provided with a depending operative device, and a supplemental water withdrawal outlet extending through and connecting the bottom of the outer vessel and ice containing vessel respectively, substantially as set forth.

5. In a buttermilk cooler, the combination of an outer insulating casing, an ice containing vessel within said casing, insulating packing material between said vessels, an innermost milk container having an upper reservoir portion, a middle contracted portion, and a flaring enlarged bottom sloping to an outlet opening within the cross area of the container, a valve-controlled conduit therefor extending downwardly through the bottoms of said vessels and having a valve provided with a depending operative device, a supplemental valve controlled water outlet extending through the bottoms of the outer casing and ice container respectively, and a two-part cover resting upon the upper portion of the outer casing and around the upper neck portion of the milk container respectively, substantially as set forth.

6. In a buttermilk cooler having an enlarged base and a contracted middle body portion, the combination therewith, of a vertically arranged pivotally mounted stirrer extending closely adjacent to the walls of the cooler, substantially as set forth.

7. In a buttermilk cooler having an enlarged base and a contracted middle body portion, the combination therewith, of a vertically arranged pivotally mounted stirrer extending closely adjacent to the walls of the cooler and having an upwardly extending stem terminating in a turning top, and a cover for the container surrounding the upper portion of said stem and providing a bearing therefor, substantially as set forth.

8. In a buttermilk cooler, the combination with a milk container having an enlarged base, a contracted middle body portion, and a centrally arranged pivotal bearing at its bottom portion, and a cover having a central stem bearing, and circulating apertures, of a vertically arranged stirring paddle extending closely adjacent to the walls of the cooler pivotally mounted on the said bearing at its bottom and having an upper stem extending through the bearing of the cover and provided with a turning terminal, substantially as set forth.

9. In a buttermilk cooler, the combination with a milk container having an enlarged base, a contracted middle body portion, and a centrally arranged pivotal bearing at its bottom portion, and a cover having a central stem bearing and circulation apertures; of a vertically arranged stirring paddle pivotally mounted on the said bearing at its bottom and having an upper stem extending through the bearing of the cover and provided with a turning terminal, and a supplemental covering cap having circulation apertures, substantially as set forth.

10. In a buttermilk cooler, the combination of a circular supporting base spaced upwardly above a supporting surface, a cup-shaped outer vessel set thereon having an insulating lining, a cup-shaped ice container set within said outer vessel and upon the bottom thereof and having spaced above its bottom an annular supporting shoulder, insulating material between the walls of said vessels, a milk container within the ice container spaced above the bottom thereof and supported upon its annular shoulder and itself provided with a sloping bottom leading to an outlet opening, a valve-controlled conduit for said opening extending downwardly through the bottoms of said vessels, an independent water withdrawal faucet extending through and connecting the bottoms of the ice container and outer vessel respectively, and a cover for the ice container and milk container respectively, substantially as set forth.

11. In a buttermilk cooler, the combination of a circular supporting base spaced upwardly above a supporting surface, a cup-shaped outer vessel set thereon having an insulating lining, a cup-shaped container set within said outer vessel and upon the bottom thereof and having spaced above its bottom an annular supporting shoulder, a milk container within the ice container spaced above the bottom thereof and supported upon its annular shoulder and itself provided with a sloping bottom leading to an outlet opening, a valve-controlled conduit for said opening extending downwardly through the bottoms of said vessels, an independent water withdrawal faucet extending through and connecting the bottoms of the ice container and outer vessel respectively, and a vertically arranged rotatable stirring paddle within the milk container, substantially as set forth.

12. In a cooler of the class described, the combination of a support, a cup-shaped outer vessel mounted on the support, a cup-shaped ice container within said outer vessel having supports for a fluid container, a fluid container within the ice container spaced above the bottom thereof and supported thereby and provided with an upper reservoir portion, a middle contracted portion, and a flaring enlarged bottom sloping toward an outlet opening within the area of the fluid container, a conduit communicating with said outlet opening extending downwardly through the bottoms of all of said vessels, and a valve controlling flow through said conduit, substantially as set forth.

13. In a cooler of the class described, the combination of a support, a cup-shaped outer vessel mounted on the support, a cup-shaped ice container within said outer vessel having supports for a fluid container, a fluid container within the ice container spaced above the bottom thereof and supported thereby and provided with a bottom sloping toward an outlet opening within the area of the fluid container, a conduit communicating with said outlet opening extending downwardly through the bottoms of all of said vessels, and a valve seated on the upper end of said conduit and operable from below, substantially as set forth.

14. In a cooler of the class described, the combination of a support, a cup-shaped outer vessel mounted on the support, a cup-shaped ice container within said outer vessel having supports for a fluid container, a fluid container within the ice container spaced above the bottom thereof and supported thereby and provided with an upper reservoir portion, a middle contracted portion, and a flaring enlarged bottom sloping toward an outlet opening within the area of the fluid container and a central pivotal bearing, a conduit communicating with said outlet opening extending downwardly through the bottoms of all of said vessels, a valve controlling flow through said conduit, and a stirring paddle pivotally mounted on said bearing and extending upwardly through the fluid container closely adjacent to the contracted portion and provided with a bearing support and a turning terminal at its upper end, substantially as set forth.

15. In a cooler of the class described, the combination of a support, a cup-shaped outer vessel mounted on the support, a cup-shaped ice container within said outer vessel having supports for a fluid container, a fluid container within the ice container spaced above the bottom thereof and supported thereby and provided with a bottom sloping toward an outlet opening within the area of the fluid container, an upwardly extending contracted body portion within the ice container and an upper laterally enlarged portion above the ice container, a cover for said portion, a cover for the ice container, a conduit communicating with the outlet opening in the base of the fluid container extending downwardly through the bottoms of all of said vessels, and a valve controlling flow through said conduit, substantially as set forth.

16. In a cooler of the class described, the combination of a support, a cup-shaped outer vessel mounted on the support, a cup-shaped ice container within said outer vessel having supports for a fluid container, a fluid container within the ice container spaced above the bottom thereof and supported thereby and provided with a bottom sloping toward an outlet opening within the area of the fluid container, an upwardly extending contracted body portion within the ice container and an upper laterally enlarged portion above the ice container, a cover for said portion, a cover for the ice container, a stirring paddle pivoted on the bottom of the fluid container extending upwardly therethrough having a bearing in the cover for the upper portion thereof and a turning terminal, a conduit communicating with the outlet opening in the base of the fluid container extending downwardly through the bottoms of all of said vessels, and a valve controlling flow through said conduit, substantially as set forth.

17. In a cooler of the class described, a fluid container of sheet metal having a bottom sloping toward an outlet opening within the cross area of the container, a main body portion above the bottom having inwardly sloping walls providing a contracted cross sectional area, an annular shoulder forming a cover support, a laterally enlarged upper chamber portion above said shoulder and a cover therefor, an ice container surrounding the lower portion of the fluid container, a cover therefor, and a valve controlled outlet conduit communicating with said outlet opening in the bottom of the fluid container, substantially as set forth.

18. In a cooler of the class described, a fluid container of sheet metal having a bottom sloping toward an outer opening within the cross area of the container, a main body portion above the bottom having inwardly sloping walls providing a contracted cross sectional area, an annular shoulder forming a cover support, a laterally enlarged upper chambered portion above said shoulder and a cover therefor, an ice container surrounding the lower portion of the fluid container, a cover therefor, an outer vessel surrounding the ice container, and a valve controlled outlet conduit communicating with said outlet opening in the bottom of the fluid container, substantially as set forth.

19. In a cooler of the class described, a fluid container of sheet metal having a bottom sloping toward an outlet opening within the cross area of the container, a main body portion above the bottom having inwardly sloping walls providing a contracted cross sectional area, an annular shoulder forming a cover support, a laterally enlarged upper chambered portion above said shoulder and a cover therefor, an ice container surrounding the lower portion of the fluid container, a cover therefor, a vertically arranged pivotally mounted stirring paddle within the fluid container, and a valve controlled outlet conduit communicating with said outlet opening in the bottom of the fluid container, substantially as set forth.

In testimony whereof, I hereunto affix my signature in the presence of two witnesses.

GEORGE VINEY.

Witnesses:
C. M. CLARKE,
FREDK. STAUB.